Patented Nov. 14, 1922.

1,435,717

UNITED STATES PATENT OFFICE.

THORNTON G. LOMAX, OF SHERMAN, TEXAS, ASSIGNOR TO FANNY LOMAX, OF GRAYSON COUNTY, TEXAS.

FURNITURE AND AUTOMOBILE BODY POLISH.

No Drawing. Application filed August 30, 1921. Serial No. 496,965.

*To all whom it may concern:*

Be it known that I, THORNTON G. LOMAX, citizen of the United States, residing at Sherman, in the county of Grayson and State of Texas, have invented certain new and useful Improvements in Furniture and Automobile Body Polish, of which the following is a specification.

An object of the invention is the production of a chemical composition to be applied primarily to varnished and enameled surfaces as a dressing or polish therefor, involving the use of asphalt as a base whereby it may be used to advantage on automobile bodies, pianos, linoleums, stained floors and almost any smooth surface treated with varnish or enamel.

A further object is to provide a polish composition in which asphalt and ammonia are the chief ingredients.

In addition to the above, the invention further provides a top dressing for leather and rubberized fabrics, such as automobile tops.

In preparing the composition, I first compound the asphalt-solution which constitutes the base of the polish. This is done by melting approximately one and one-half pounds of asphalt into which, while still hot, is poured, a little at a time, approximately nine liquid ounces of 28% ammonia. This mixture is stirred constantly and as it thickens, kerosene is added in sufficient quantity to keep the asphalt thin. Good results are obtained by alternating the ammonia with the kerosene, there being approximately one quarter gallon in this manner to the mixture. This constitutes the asphalt solution or base which is the practical part of the polish, the other ingredients with the exception of ammonia, being more or less non-essential.

The treatment of the asphalt with ammonia and kerosene as described above may be termed the first stage in the process of compounding the polish and results in a plastic mass of a semi-liquid consistency which is allowed to cool. When cooled, it provides a dressing for leather and rubberized fabrics, such as automobiles tops and will preserve the finish of the top without injury to the varnish. It may be applied by a small flat brush until the top is well coated, after which the top is wiped off thoroughly with a soft cloth until all surplus dressing is removed. The kerosene which is added to the mixture of asphalt and ammonia prevents the asphalt from getting too hard when it cools. And, if desired, any auxiliary agent such as gasoline may be added to thin the mixture and to hasten the drying.

Having completed the base, the same is incorporated in a mixture comprising the following named ingredients in the proportions stated:

28% ammonia 2 parts.
Oil of cedar commercial 12 parts.
Lubricating oil 16 parts.
Solution of asphalt (as above) 22 parts.
Turpentine 4 parts.
Kerosene 14 parts.

The above mixture, which constitutes the second stage of the composition is then permitted to stand for approximately 24 hours after which the final composition is produced by uniting 2 parts of pure rain water with 1 part of the mixture, the water being poured in, a little at a time, while the whole is violently agitated to cause the water and mixture to mix thoroughly until reduced to a liquid of such consistency as to enable it to be readily applied to the surface to be coated or polished. This polishing liquid may be applied in one or more coats or layers, in the ordinary manner, according to the nature of the article requiring it, and possesses in a high degree all of the desired properties of a polishing composition.

What is claimed is:—

1. A polishing composition having a solution of asphalt and ammonia as a base.

2. A polishing composition having a solution including asphalt, ammonia and kerosene as a base.

3. A composition of matter including 1½ lbs of asphalt, 9 liquid ounces of ammonia, and ¼ gallon of kerosene.

4. A polish composition comprising ammonia, oil of cedar commercial, lubricating oil, asphalt solution, turpentine, and kerosene.

5. A polish composition comprising the following named ingredients in the proportions stated, 28% ammonia 2 parts, oil of cedar commercial 12 parts, lubricating oil 16 parts, solution of asphalt 22 parts, turpentine 4 parts, and kerosene 14 parts.

6. The method of compounding a polish composition which consists in first providing a base consisting in melting a suitable quantity of asphalt, diluting the same with kerosene and ammonia poured alternately thereinto, in such quantities as to keep the asphalt thin, adding ammonia, oil of cedar commercial, lubricating oil and kerosene, permitting the mixture to stand for 24 hours, and then compounding 2 parts of pure rain water with 1 part of the mixture, pouring the water in, a little at a time, and violently agitating the whole to cause the water and mixture to become thoroughly mixed.

7. A composition of matter including asphalt solution, kerosene, ammonia, lubricating oil, and oil of cedar commercial.

In testimony whereof I affix my signature.

THORNTON G. LOMAX.